W. H. DAMBRUCH.
TURNING CAKE STAND.
APPLICATION FILED MAY 3, 1918.

1,297,802.  Patented Mar. 18, 1919.

Witnesses,
J. A. Schoedinger,
H. O. Parker

Inventor,
William H. Dambruch
By Chandler & Chandler
Attorneys

UNITED STATES PATENT OFFICE.

WILLIAM H. DAMBRUCH, OF MILWAUKEE, WISCONSIN.

TURNING CAKE-STAND.

1,297,802.	Specification of Letters Patent.	Patented Mar. 18, 1919.

Application filed May 3, 1918. Serial No. 232,274.

*To all whom it may concern:*

Be it known that I, WILLIAM H. DAMBRUCH, a citizen of the United States, residing at Milwaukee, in the county of Milwaukee, State of Wisconsin, have invented certain new and useful Improvements in Turning Cake-Stands; and I do hereby declare the following to be a full, clear, and exact description of the invention, such as will enable others skilled in the art to which it appertains to make and use the same.

The invention relates to a stand, and more particularly to the class of rotary cake stands.

The primary object of the invention is the provision of a stand of this character wherein the rest spindle is mounted within the stand or pedestal in a novel manner, and the rest is connected with the spindle so that the same can be detached when required, the rest being readily rotatable so that the cake when supported thereon can be conveniently handled for the cutting thereof or for display purposes.

Another object of the invention is the provision of a stand of this character which is extremely simple in construction, readily and easily assembled, reliable and efficient in its purpose, and inexpensive to manufacture.

With these and other objects in view the invention consists in the features of construction, combination and arrangement of parts as will be hereinafter more fully described, illustrated in the accompanying drawing, and pointed out in the claim hereunto appended.

In the accompanying drawing:—

Similar reference characters indicate corresponding parts throughout the several views of the drawing.

Figure 1:
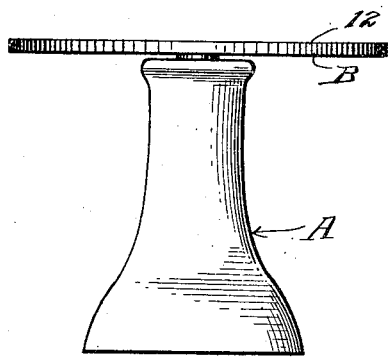
Figure 1 is a side elevation of a stand constructed in accordance with the invention.
Figure 2:
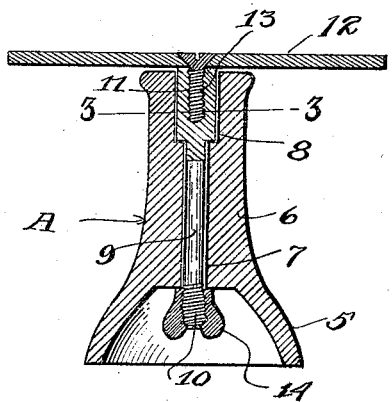
Fig. 2 is a vertical, longitudinal, sectional view thereof.
Figure 3:
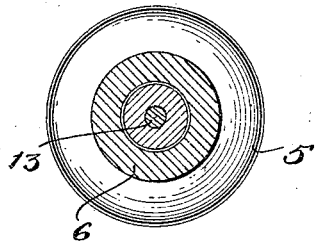
Fig. 3 is a sectional view on the line 3—3 of Fig. 2.
Figure 4:
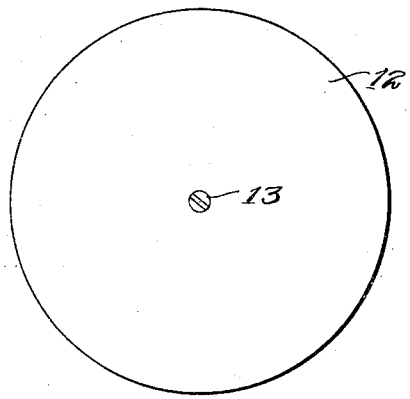
Fig. 4 is a fragmentary plan view showing in detail the connection of the rest with the spindle.

Referring to the drawing in detail, A designates generally the pedestal and B the rotatable cake rest, the details of which will be hereinafter fully described.

The pedestal A comprises a concavo convex hollow base 5 formed with a central upstanding post 6, the same being formed with a longitudinal central bore 7 merging into a larger socket 8 at its upper end, the socket opening through the top of the post and engaged within said socket and bore is a spindle 9 having a threaded lower end 10, the spindle being correspondingly shaped to the socket 8 and bore 7, and is formed in its upper larger end with a screw receiving hole 11 for a purpose presently described.

Resting upon the larger end of the spindle 9 is a disk like cake rest 12 formed with a counter-sunk center hole for receiving a detachable screw 13 which is threaded within the screw hole 11 in the spindle 9, the head of the screw being flush with the upper face of the rest 12. The larger end of the spindle 9 protrudes a slight distance above the upper end of the post 6 so as to hold the rest B out of contact with the post. The rest is free for rotation with the spindle 9 in the pedestal A, as will be clearly apparent.

Detachably engaged on the threaded lower end 10 of the spindle 9 is a winged nut 14 which is concealed within the base 5 and holds the spindle rotatably engaged in the pedestal.

From the foregoing it is thought that the construction and manner of operation of the stand will be clearly understood, and therefore a more extended explanation has been omitted.

What is claimed is:

The combination with a pedestal forming a central post having a concave base and also provided with a central vertical bore merging into a larger socket at the upper end of said post, a spindle correspondingly shaped to the bore and socket, a rest engaged with the upper end of the spindle and detachably fastened thereon, and a fastener detachably securing the spindle in the post.

In testimony whereof, I affix my signature, in the presence of two witnesses.

WILLIAM H. DAMBRUCH.

Witnesses:
 OTTO E. GROTH,
 MARGARET GROTH.

Copies of this patent may be obtained for five cents each, by addressing the "Commissioner of Patents, Washington, D. C."